United States Patent
Dubois et al.

(10) Patent No.: US 8,352,065 B2
(45) Date of Patent: Jan. 8, 2013

(54) METHOD FOR GENERATING A TRIMMING SETPOINT FOR AN OPHTHALMIC LENS

(75) Inventors: Frédéric Dubois, Charenton le Pont (FR); David Freson, Charenton le Pont (FR); Eric Belloni, Charenton le Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 203 days.

(21) Appl. No.: 12/875,686

(22) Filed: Sep. 3, 2010

(65) Prior Publication Data

US 2011/0066276 A1     Mar. 17, 2011

(30) Foreign Application Priority Data

Sep. 14, 2009 (FR) ...................................... 09 04382

(51) Int. Cl.
G06F 17/50     (2006.01)
G06F 19/00     (2011.01)

(52) U.S. Cl. ............................. 700/182; 700/97; 703/1

(58) Field of Classification Search .................... 700/95, 700/97, 117, 159, 160, 164, 182; 351/41, 351/159.42, 159.74, 159.75; 451/5, 41, 42, 451/43; 703/1
See application file for complete search history.

(56) References Cited

U.S. PATENT DOCUMENTS

| | | | | |
|---|---|---|---|---|
| 6,751,522 B2 * | 6/2004 | Okada et al. | .................. | 700/164 |
| 6,959,227 B2 * | 10/2005 | Okada et al. | .................. | 700/164 |
| 7,628,486 B2 * | 12/2009 | Tanaka et al. | ............ | 351/159.75 |
| 7,848,843 B2 * | 12/2010 | Shibata | ......................... | 700/164 |
| 2007/0213861 A1 | 9/2007 | Takeichi | | |
| 2007/0242221 A1 * | 10/2007 | Guilloux et al. | .............. | 351/159 |
| 2008/0088794 A1 * | 4/2008 | Tanaka et al. | .................. | 351/177 |
| 2008/0231794 A1 * | 9/2008 | Yanagi et al. | ................... | 351/41 |
| 2008/0248720 A1 * | 10/2008 | Shibata | ............................. | 451/5 |
| 2009/0222122 A1 * | 9/2009 | Daimaru et al. | ............. | 700/160 |
| 2010/0079722 A1 * | 4/2010 | Guilloux et al. | ............. | 351/169 |

FOREIGN PATENT DOCUMENTS

| | | |
|---|---|---|
| EP | 0750172 A2 | 12/1996 |
| EP | 1642678 A1 | 4/2006 |
| FR | 2894504 A1 | 6/2007 |

OTHER PUBLICATIONS

French Search Report, dated Mar. 9, 2010, corresponding from French Application.

* cited by examiner

*Primary Examiner* — Charles Kasenge
(74) *Attorney, Agent, or Firm* — Young & Thompson

(57) ABSTRACT

A method for generating a trimming setpoint for an ophthalmic lens for it to be mounted in a surround of a spectacle frame, includes:
a) acquiring the shape of a first longitudinal profile of the surround,
b) constructing, on a two-dimensional projection of the first longitudinal profile, at least two predetermined geometrical figures, by adjusting their dimensions to those of the two-dimensional projection,
c) calculating differences between the two-dimensional projection of the first longitudinal profile and each of the predetermined geometrical figures,
d) from the target geometrical figures, each of which has an associated trimming parameter, selecting the target geometrical figure that is closest to the first longitudinal profile according to the differences,
e) calculating the trimming setpoint according to the shape of the first longitudinal profile and the trimming parameter associated with the selected target geometrical figure.

17 Claims, 5 Drawing Sheets

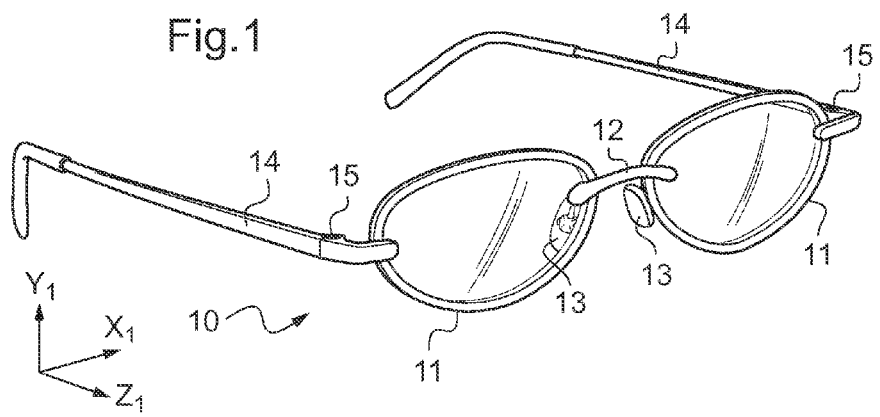
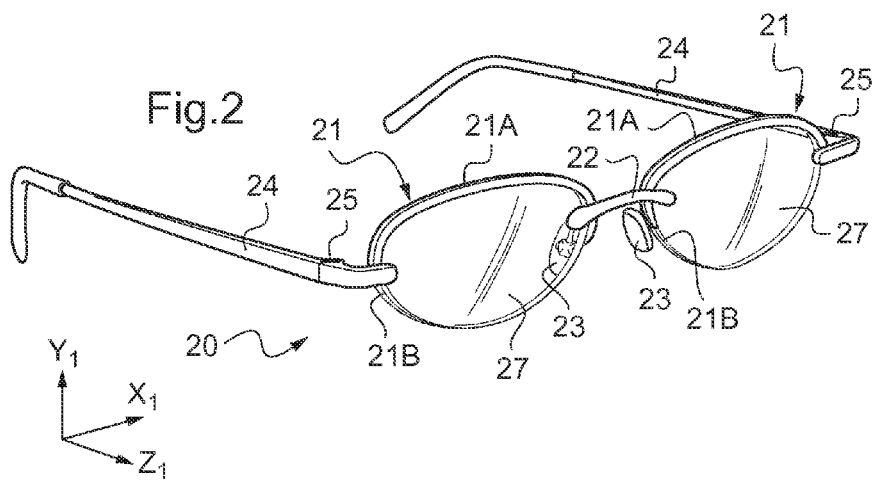
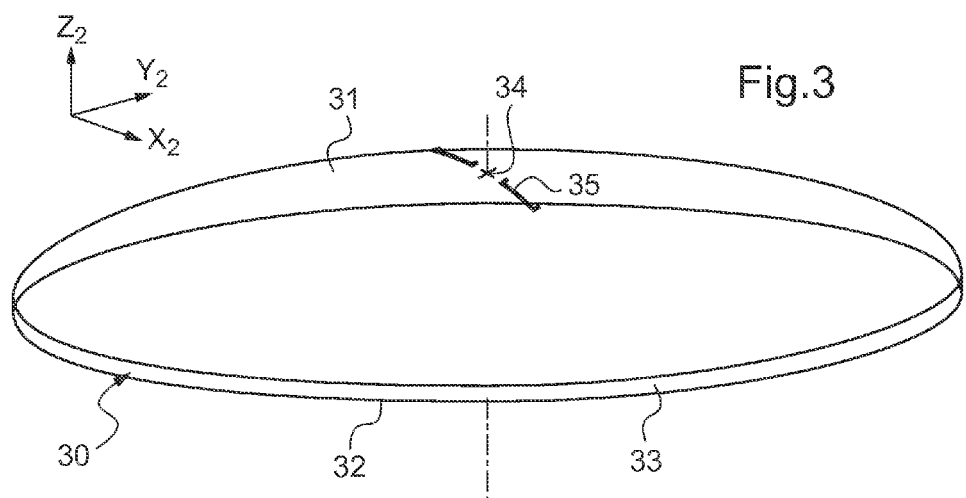

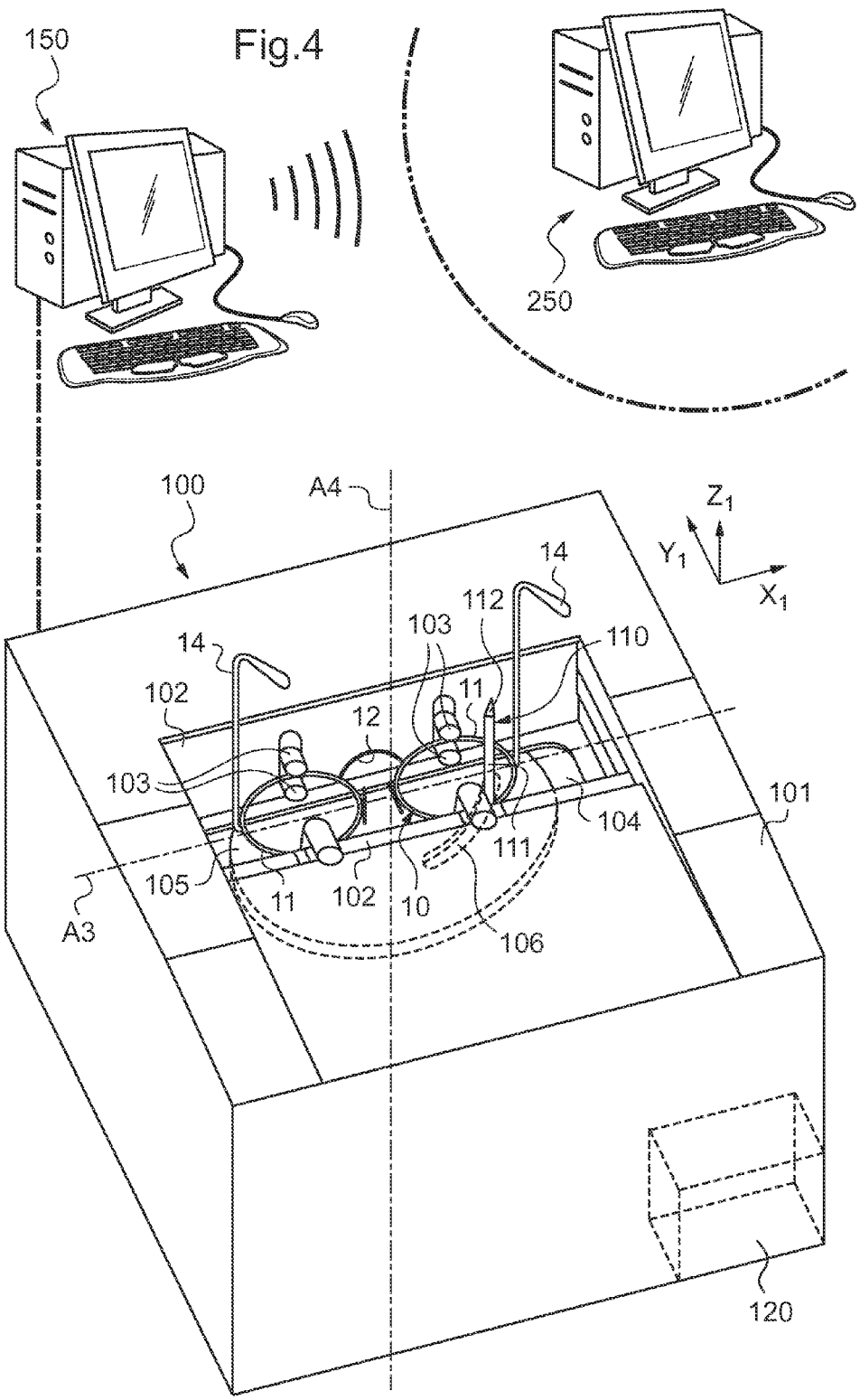

c1 = 0,02 ; c2 = 0,03 c1 = 0,89 ; c2 = 1,67 c1 = 0,65 ; c2 = 0,94 c1 = 0,00 ; c2 = 0,00 c1 = 2,72 ; c2 = 5,87

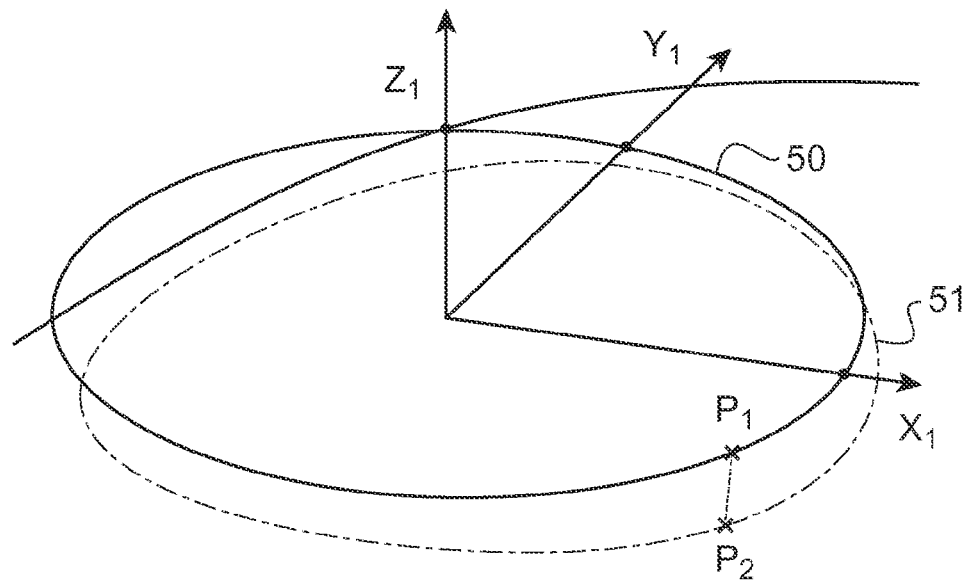
Fig.7
Fig.8
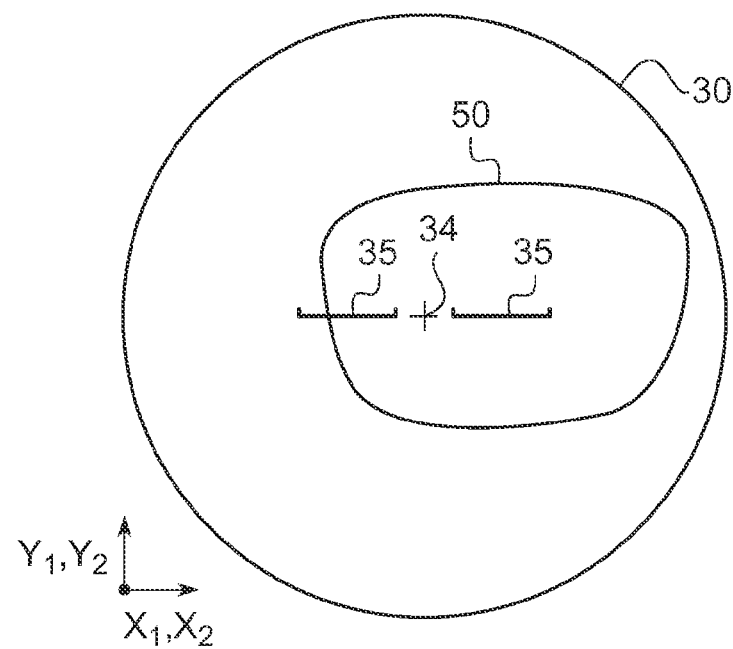

METHOD FOR GENERATING A TRIMMING SETPOINT FOR AN OPHTHALMIC LENS

TECHNICAL FIELD OF THE INVENTION

The present invention relates generally to the preparation of ophthalmic lenses for them to be fitted in surrounds of circular or half-rim spectacle frames.

TECHNOLOGICAL BACKGROUND

The technical part of the optician's profession involves mounting a pair of corrective ophthalmic lenses on a spectacle frame selected by a wearer.

This mounting is divided up into three main operations:
acquisition of the contours of the surrounds of the selected spectacle frame,
centering of each lens, which consists in appropriately positioning and orienting the acquired contours relative to the lenses so that, once assembled, each lens is centered on the pupil of the corresponding eye of the wearer, then
machining of each lens, which consists in cutting it along this contour.

In the context of the present invention, interest is more particularly focused on the spectacle frames with surrounds, that is to say on circular and half-rim spectacle frames.

The concrete objective of the optician is then to cut the ophthalmic lens so that it can be mechanically and aesthetically adapted to the shape of the corresponding surround of the selected frame, while ensuring that this lens best exercises the optical function for which it was designed.

The machining operation comprises in particular, in the case of circular frames, a beveling step used to form on the edge of the lens a fitting rib, commonly called a bevel, capable of being fitted into a groove, commonly called a bezel, which runs along the internal face of the corresponding surround of the frame.

The machining operation however comprises, in the case of half-rim frames, an edge-grooving step with which to form a fitting groove on the edge of the lens. During mounting, this fitting groove is fitted onto a rib that runs along the internal face of the corresponding half-rim (or "arch") of the frame. The ophthalmic lens is then secured against this arch with the help of a thread that is fitted into the fitting groove and whose ends are connected to the ends of the arch.

The acquisition and machining operations must be carried out with care so that the lens can be perfectly fitted into its surround, without effort and "at the first attempt", that is to say, without requiring remachining (in the case of circular or half-rim frames) or requiring any bending of the thread (in the case of half-rim frames).

To acquire the form of the surround, a contour reading appliance is generally used which comprises a feeler which records the form of the groove of the surround, or of the groove of a template representative of the form of the surround. Recording errors inherent to the operation of the reading appliance are, however, observed on completion of this feeling operation. Machining errors that are also inherent to the operation of the trimming appliance are also observed on completion of the machining operation.

Despite the care paid to these operations in order to reduce these errors, it is observed that some ophthalmic lenses remain difficult to mount in their surrounds. It is then necessary, to dispel any risk of the lens slipping out from its surround, to remachine the lens and/or modify the length of the nylon thread, which is tedious to do.

SUBJECT OF THE INVENTION

In order to remedy the abovementioned drawbacks of the state of the art, the present invention proposes a method for generating a trimming setpoint for an ophthalmic lens which makes it possible to forsee and prevent any difficulties in mounting ophthalmic lenses in their surround.

More particularly, there is proposed according to the invention a method for generating a trimming setpoint comprising the steps consisting in:
a) acquiring the shape of a first longitudinal profile of said surround,
b) constructing, on a two-dimensional projection of said first longitudinal profile, at least two predetermined geometrical figures, by adjusting their dimensions to those of said two-dimensional projection,
c) calculating differences between the two-dimensional projection of said first longitudinal profile and each of said predetermined geometrical figures,
d) from the target geometrical figures, each of which has an associated trimming parameter, selecting the target geometrical figure that is closest to the first longitudinal profile according to said differences,
e) calculating said trimming setpoint according to the shape of the first longitudinal profile and the trimming parameter associated with the selected target geometrical figure.

The applicant has observed that some of the mounting difficulties stemmed from the form of the surrounds of the selected spectacle frames.

The applicant, in particular, observed that the elongate form of some frames was the cause of these difficulties.

These difficulties result from the fact that the pressure of the surround on the ophthalmic lens is not uniformly distributed on such spectacle frames. In practice, the more elongate the surround, the greater the pressure on the nasal and temporal parts of the surround, which makes mounting difficult. Furthermore, the more elongate the surround, the lower the pressure on the bottom and top parts of the surround, which can cause the lens to slip out.

According to the invention, the method makes it possible to characterize the form of the contour of the surround, in order to provide for the fitting difficulties that may arise, so as to be able to remedy them from the first machining of the lens. This method therefore makes it possible to avoid having to remachine the lens or having to modify the length of the thread (in the case of half-rim frames).

Other advantageous and nonlimiting features of the method according to the invention are as follows:
in step e), on the one hand, the spatial form of a second longitudinal profile, obtained from the projection of said first longitudinal profile onto a characteristic surface of said ophthalmic lens, is determined, and, on the other hand, the second longitudinal profile is distorted in two different directions, with distortion coefficients applied to each direction, at least one of which is a function of the trimming parameter associated with the selected target geometrical figure, so as to make equal the perimeter length of said second longitudinal profile and the perimeter length of said first longitudinal profile, and a rough trimming setpoint for the ophthalmic lens is deduced from the distorted second longitudinal profile;
said characteristic surface is the front or rear face of the ophthalmic lens;

said characteristic surface is a surface situated between the front and rear faces of the ophthalmic lens and parallel to one of these front and rear faces;

in the step e), a superfinishing setpoint for trimming the ophthalmic lens is determined according to the trimming parameter associated with the selected target geometric figure;

in the step b), at least three predetermined geometrical figures are constructed;

in the step b), said predetermined geometrical figures comprise an ellipse and/or a rectangle and/or a rectangle with rounded corners;

in the step d), said target geometrical figures comprise at least said predetermined geometrical figures;

in the step b), the dimensions of said predetermined geometrical figures are adjusted so that at least one of said geometrical figures is circumscribed or inscribed on the two-dimensional projection of the first longitudinal profile;

in the step b), the dimensions of said predetermined geometrical figures are adjusted so that the difference between the two-dimensional projection of the first longitudinal profile and at least one of said geometrical figures is minimal;

in the step c), said differences are calculated by determining the area of the surface delimited between the two-dimensional projection of the first longitudinal profile and each of said geometrical figures;

the determination of the difference between the two-dimensional projection of the first longitudinal profile and each geometrical figure comprises operations involving calculating, in polar coordinates, the representative functions of said two-dimensional projection and of each geometrical figure, then calculating the fourier series associated with these representative functions, then calculating the descriptors ($FD_{n40}$, $FD_{n41}$, $FD_{n42}$, $FD_{n43}$) of said fourier series, and finally deducing said differences from said descriptors;

in step d) the ratio of said differences is calculated, and from the predetermined intervals each associated with a target geometrical figure, the interval within which each ratio is located is determined;

in step d), the ratio of the length to the width of a rectangle circumscribed on the first longitudinal profile is calculated, and said target geometrical figure is selected, also according to said ratio;

said surround comprises a rim or an arch (21A) fitted with a thread.

The invention also relates to a method for configuring a device for preparing an ophthalmic lens for it to be mounted in a surround of a spectacle frame, comprising operations involving:

generating a trimming setpoint for a first ophthalmic lens according to the abovementioned method, trimming said first ophthalmic lens according to the generated trimming setpoint, measuring, on the trimmed ophthalmic lens, a longitudinal profile running along its edge, calculating a difference between the form of the measured longitudinal profile and the form of the distorted second longitudinal profile, searching, in a database register, each record of which has an associated target geometrical figure and stores a mean difference, for the record that is associated with the target geometrical figure selected in step d), reading the mean difference stored in said record and modifying it according to the calculated difference.

Advantageously then, in order to generate the trimming setpoint for another ophthalmic lens according to the abovementioned method, in step e), the database register is searched for the record that is associated with the target geometrical figure selected in step d), the mean difference stored in this record is read, and the distortion coefficient of the second longitudinal profile is calculated according to this read mean difference.

DETAILED DESCRIPTION OF AN EXEMPLARY EMBODIMENT

The following description, with respect to the appended drawings, given as a nonlimiting example, will clearly convey what the invention consists of and how it can be implemented.

In the appended drawings:

FIG. 1 is a perspective diagrammatic view of a full-rim spectacle frame;

FIG. 2 is a perspective diagrammatic view of a half-rim spectacle frame;

FIG. 3 is a perspective diagrammatic view of an untrimmed ophthalmic lens;

FIG. 4 is a perspective diagrammatic view of a contour reading appliance;

FIG. 7 is a perspective view of the longitudinal profile of FIG. 5 and its projection onto a face of a presentation lens;

FIG. 8 is a front view of the ophthalmic lens of FIG. 3, in the plane of FIG. 5, on which is superimposed the longitudinal profile of FIG. 5;

SPECTACLE FRAME

Figure 5:
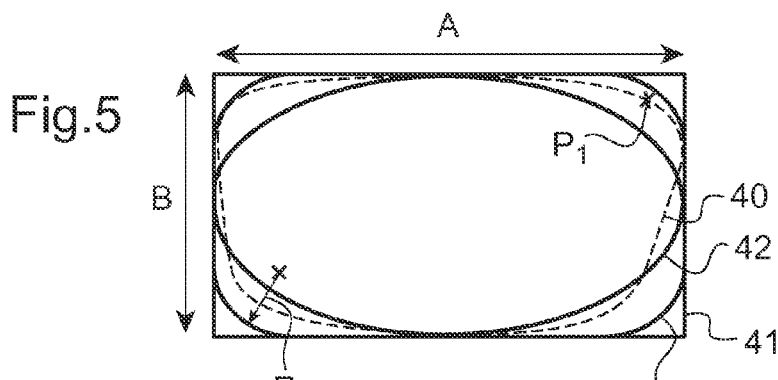
FIGS. 5 and 6A to 6E show longitudinal profiles representative of the form of surrounds of variously shaped spectacle frames, upon which are superimposed geometrical figures characterizing these forms, seen in projection in a median plane of the surrounds of the frame, substantially perpendicular to the temple arms.

FIGS. 1 and 2 represent two spectacle frames 10, 20 respectively full-rim and half-rim, each comprising two surrounds 11, 21.

More particularly, in FIG. 1, the full-rim spectacle frame 10 comprises two rims 11 each intended to accommodate an ophthalmic lens and to be positioned facing one of the two eyes of the wearer when the latter wears said frame.

The two rims 11 are linked to one another by a bridge 12. They are also each equipped with a nose pad 13 that is able to rest on the nose of the wearer and a temple arm 14 that is able to rest on one of the ears of the wearer. Each temple arm 14 is hinged on the corresponding circle by means of a barrel hinge 15.

The two rims 11 of the spectacle frame 10 have an internal edge in which is provided a fitting groove, commonly called a groove, of a generally dihedral-shaped section.

The two rims 11 have a non-zero curve. This curve can be characterized by a mean radius of curvature corresponding to the radius of curvature of a sphere passing through four points of the groove situated equidistantly in pairs.

In FIG. 2, the surrounds 21 of the half-rim spectacle frame 20 each comprise an arch 21A (or "half-rim") and a nylon thread 21B, the two ends of which are connected to the ends of this arch 21A. These arches 21A and nylon threads 21B are used together to hold two lenses on the spectacle frame 20.

The two arches 21A are linked to one another by a bridge 22. Each arch 21A is equipped with a nose pad 23 that is able to rest on the nose of the wearer and a temple arm 24 that is able to rest on one of the ears of the wearer. Each temple arm 24 is hinged on the corresponding arch 21A by means of a barrel hinge 25.

The two arches 21A of the spectacle frame 20 have an internal edge along which runs a fitting aid.

As shown in FIG. 2, the spectacle frame 20 bears two presentation lenses 27 delivered to the optician with the frame. These two presentation lenses 27 will be used as a shape template for trimming the ophthalmic lenses to be mounted on the spectacle frame 20.

The two surrounds 21 have a non-zero curve. This curve can be characterized by the radius of curvature of the spherical front face of the presentation lens 27.

Ophthalmic Lens

As shown in FIG. 3, the ophthalmic lens 30 has two optical faces, front 31 and rear 32, and a rim 33.

The front optical face 31 is in this case spherical and has a known radius of curvature.

The edge 33 of the lens has an initially circular contour. The lens is, however, intended to be trimmed to the shape of the corresponding surround 11, 21 of the spectacle frame 10, 20, so as to be able to be fitted into the latter.

In the case where the selected frame is circular (FIG. 1), the ophthalmic lens 30 is more specifically intended to be trimmed to have on its edge 33 a fitting rib (or bevel) that is able to be fitted into the groove of the corresponding rim 11 of the spectacle frame 10.

In the case where the selected frame is half-rim (FIG. 2), the ophthalmic lens 30 is, on the contrary, intended to be trimmed to have on its edge 33 a fitting groove which is able to be fitted onto the fitting rib of the corresponding arch 21A of the spectacle frame and which is able to accommodate the nylon thread 21B.

This ophthalmic lens 30 has optical characteristics that are determined according to the needs of the spectacle wearer. They have in particular spherical, cylindrical and prismatic refringence properties which are specific to the wearer.

This ophthalmic lens 30 is also provided with markings 34, 35 which provide a convenient identification of the optical coordinate system of the ophthalmic lens 30 for its mounting on the spectacle frame 10, 20 selected by the wearer. These markings in this case consist of temporary ink markings 34, 35. They could as a variant consist of permanent markings, such as micro-engravings.

Here, these markings comprise a centering cross 34 that is used to identify the position of the centering point of the lens, that is to say, in the case of a lens having an exclusively spherical optical power, the point where the incident ray and the transmitted ray have the same axis.

They also comprise, either side of this centering cross 34, two horizon lines 35 identifying the horizontal of the ophthalmic lens 30.

The optical coordinate system of the ophthalmic lens 30 is then characterized by an orthonormal frame of reference comprising a horizontal axis $X_2$ parallel to said horizon lines 35, an ordinate axis $Y_2$, and a normal axis $Z_2$ which is perpendicular to the plane tangential to the front face of the ophthalmic lens 30 at the centering point 34.

Client and Manufacturer Terminals

The invention offers a particular advantage when the preparation of the lenses is entrusted to lens manufacturers other than the opticians, that is to say when the opticians act as "order givers" who subcontract the manufacture and trimming of the lenses to such manufacturers.

To illustrate this configuration, we will consider here, on the one hand, a client terminal installed with an optician for ordering lenses, and, on the other hand, a manufacturer terminal installed with a lens manufacturer for the manufacture and trimming of lenses.

The client terminal comprises a computer unit 150 (FIG. 4), in this case a desktop computer, for recording and transmitting ophthalmic lens order data, for example via an IP-based communication protocol (Internet type). These order data comprise prescription data relating to the corrections to be made to the eyes of the wearer and shape data relating to the spectacle frame 10, 20 selected by the wearer.

As for the manufacturer terminal, it comprises a computer unit 250 for receiving, recording and processing the order data transmitted by the client terminal. It also comprises an ophthalmic lens manufacturing device, comprising, for example, means for molding lenses in accordance with the prescription data and means for trimming lenses in accordance with the shape data.

Contour Reading Appliance

In the client terminal, the optician in this case has a contour reading appliance. This contour reading appliance is a means well known to those skilled in the art and is not in itself the subject of the invention described. It is, for example, possible to use a contour reading appliance as described in the patent EP 0 750 172 or marketed by Essilor International under the trade name Kappa of under the trade name Kappa CT.

FIG. 4 is an overview of this contour reading appliance 100, as it appears to its user. This appliance comprises a top cover 101 covering all of the appliance apart from a central top portion in which can be arranged a spectacle frame 10 or a presentation lens 27.

The contour reading appliance 100 is intended to read, in the case where the selected spectacle frame is circular, the shape of the bottom edge of the groove of each rim 11 of this spectacle frame 10. It is, on the other hand, intended to read, in the case where the selected spectacle frame is half-rim, the shape of the contour of each presentation lens 27.

The contour reading appliance 100 comprises, for this purpose, first means for securing a full-rim spectacle frame 10, and second means for securing a presentation lens 27.

The first securing means comprise a set of two jaws 102 that can move relative to one another to form a clamping device. Each of the jaws 102 is provided with two pairs of mobile mountings 103 to form two clamps intended to clamp the spectacle frame 10 in order to immobilize it.

The second securing means, which cannot be seen in the figures, comprise a pin which extends just into the top central portion of the appliance, and the top end of which is arranged to cooperate with one of the faces of the presentation lens 27, in order to immobilize it in this central top portion.

In the space left visible by the opening in the cover 101, a frame 104 can be seen. A deck (not visible) can be moved in translation on this frame 104 along a transfer axis A3. A revolving plate 105 is mounted to revolve on this deck.

This revolving plate 105 is therefore able to assume three positions on the transfer axis A3, namely:

a first position in which the center of the revolving plate 105 is arranged between the two pairs of mountings 103 securing the right rim of the spectacle frame 10, a second position in which the center of the revolving plate 105 is arranged between the two pairs of mountings 103 securing the left rim of the spectacle frame 10, and a third intermediate position in which the center of the revolving plate 105 is situated in the axis of the pin securing the presentation lens 27.

The revolving plate 105 has a rotation axis A4 defined as the axis normal to the front face of this revolving plate 105 and passing through its center. It is adapted to pivot about this axis relative to the deck. The revolving plate 105 also comprises an oblong opening 106 in the form of an arch of rim through which projects a feeler 110. This feeler 110 comprises a support stem 111 with an axis perpendicular to the plane of the front face of the revolving plate 105 and, at its free end, a feeling finger 112 of an axis perpendicular to the axis of the support stem 111.

The feeling finger 112 is arranged to follow, by sliding or possibly rolling along the bottom edge of the groove of each rim 11 of the spectacle frame 10.

The support stem 111 is arranged to slide along the contour of the presentation lens 27.

The shape reading appliance 100 comprises actuation means (not shown) that are adapted, firstly, to slide the support stem 111 along the opening 106 in order to modify its radial position relative to the rotation axis A4 of the revolving plate 105, secondly, to vary the angular position of the revolving plate 105 about its rotation axis A4, and, thirdly, to position the feeling finger 112 of the feeler 110 at a greater of lesser altitude relative to the plane of the front face of the revolving plate 105.

To sum up, the feeler 110 is provided with three degrees of freedom, namely a first degree of freedom $\rho$ consisting of the capacity of the feeler 110 to be moved radially relative to the rotation axis A4 by virtue of its freedom of movement along the arch of rim formed by the opening 106, a second degree of freedom $\theta$ consisting of the capacity of the feeler 110 to pivot about the rotation axis A4 by virtue of the rotation of the revolving plate 105 relative to the deck, and a third degree of freedom z consisting of the capacity of the feeler 110 to be translated along an axis parallel to the rotation axis A4 of the revolving plate 105.

Each point read by the end of the feeling finger 112 of the feeler 110 is identified in a coordinate system called a frame mounted coordinate system.

This coordinate system is in this case characterized by an orthonormal coordinate comprising a horizontal axis $X_1$ parallel to said transfer axis A3, an ordinate axis $Y_1$ orthogonal to the transfer A3 and rotation A4 axes, and a normal axis $Z_1$.

The contour reading appliance 100 also comprises an electronic and/or computer device 120 used, on the one hand, to drive the actuation means of the shape reading appliance 100, and, on the other hand, to acquire and transmit to the computer unit 150 the coordinates of the end of the feeling finger 112 of the feeler 110.

Trimming Setpoint Generation Method

The method for preparing an ophthalmic lens 30 for it to be mounted in a surround 11, 21 of a spectacle frame 10, 20 comprises two main phases, namely a first phase for generating a trimming setpoint, and a second phase for trimming the ophthalmic lens according to this trimming setpoint.

The second trimming phase generally proceeds in three successive operations, namely:
  a rough trimming operation which consists in bringing the initially circular contour of the ophthalmic lens to a shape approximating to the desired shape, that is to say, a shape approximating that of the surround of the selected spectacle frame,
  a finishing operation which consists in forming a fitting rib or a fitting groove on the edge of the ophthalmic lens for it to be mounted on a respectively circular or half-rim spectacle frame, and,
  a superfinishing operation which consists in polishing the edge of the lens and/or chamfering its sharp edges.

Since the invention relates more specifically to the first phase for generating the trimming setpoint, this second trimming phase that is well known to those skilled in the art will not be described here in more detail.

The first phase for generating the trimming setpoint is divided up into seven successive operations.

First Operation

The first operation consists in defining the needs of the spectacle wearer.

For this, the wearer goes in turn to an optometrist and to an optician.

The optometrist carries out various examinations relating to the visual acuity of the wearer, so as to determine prescriptions that will be used as a basis for grinding two ophthalmic lenses adapted to each of the eyes of the wearer. He determines in particular, the unifocal, bifocal or progressive type of the ophthalmic lenses, and the spherical, cylindrical and prismatic refringence properties of these lenses.

As for the optician, he allows the wearer to select a spectacle frame 10, 20 that is agreeable to him, in this case a circular or half-rim spectacle frame. He then carries out the necessary measurements for the centering of the ophthalmic lenses on the selected frame, so that, once assembled on the frame, the lenses are correctly centered facing the eyes of the wearer in order to best exercise the optical functions for which they are designed.

The optician determines, in particular, the position of the pupilary points of the wearer within the frame mounted coordinate system. These pupilary points correspond to the points positioned facing the pupils of the wearer on the lenses fitted in the selected frame. The pupilary points are more particularly identified relative to the contour of each surround 11, 21 of the selected spectacle frame 10, 20, by means of two parameters called pupilary difference and pupilary height. The pupilary difference corresponds to the greatest horizontal distance between the pupilary point and the nasal area of the surround. The pupilary height corresponds to the greatest vertical distance between the pupilary point and the bottom area of the surround.

Second Operation

The second operation consists in recording the shapes of the contours of the surrounds 11, 21 of the selected spectacle frame 10, 20, by means of a contour reading appliance 100 as represented in FIG. 4.

Initially, the spectacle frame 10 of the presentation lens 27 is immobilized in the first or second securing means of the contour reading appliance 100.

If it is a circular spectacle frame, the latter is immobilized so that each of its rims 11 is ready to be felt along a path that starts between the two mountings 103 clamping the bottom portion of the corresponding rim 11 of the frame, and which follows the groove of the rim 11 in order to cover all the circumference of this rim 11.

In the initial position, when the feeling finger 112 is positioned between the two mountings 103, the electronic and/or computer device 120 defines as zero the angular position $\theta_1$ and the altitude $z_1$ of the end of the feeling finger 112 of the feeler 110.

The actuation means then pivot the revolving plate 105 over a complete revolution. During this pivoting, the actuation means impose a constant radially force on the feeler 110 in the direction of the rim 11, so that the feeling finger 112 of the feeler 110 slides along the bottom edge of the groove of the rim 11, without riding up along the front and rear sides of the groove.

Figure 9:
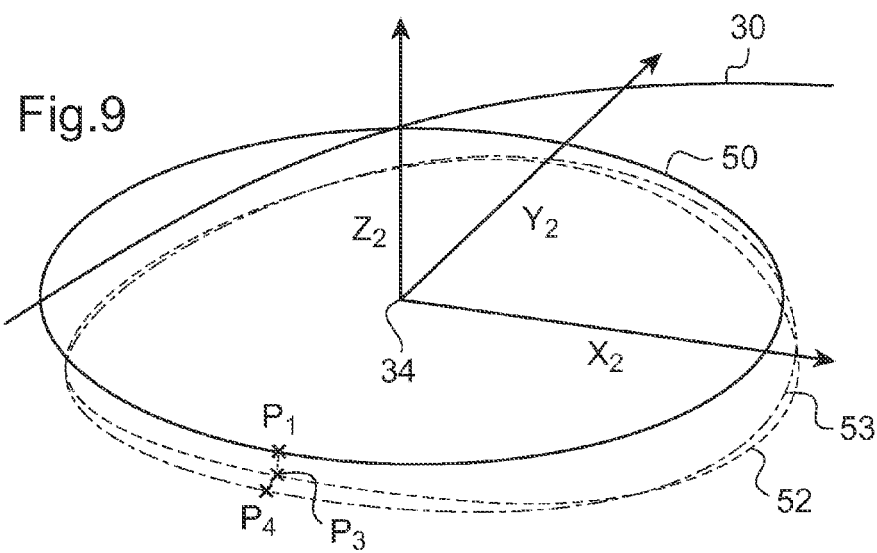
FIG. 9 is a perspective view of the longitudinal profile of FIG. 5, of this views projection onto a face of the ophthalmic lens of FIG. 3, and of a distortion of this projection in order to calculate the trimming setpoint.

During the rotation of the revolving plate 105, the electronic and/or computer device 120 reads the spatial coordinates $\rho_1, \theta_1, z_1$ of a plurality of points $P_1$ of the bottom edge of the groove (for example 360 points angularly separated by 1 degree), identified by the coordinates $X_1, Y_1, Z_1$. The 360 felt points $P_1$ thus correspond to the trace of the bottom edge of the groove in 360 transversal sections of the rim 11 angularly separated by 1 degree. As shown in FIG. 9, these 360 felt points $P_1$ thus define a first longitudinal profile 50 of the surround 11, substantially the same as the bottom edge of the groove.

If it is a half-rim spectacle frame, one of its presentation lenses 27 is immobilized at the center of the central top opening of the cover 101, so that its edge can be felt over its entire contour by the support stem 111.

In the initial position, when the support stem 111 is positioned against the edge of the presentation lens 27, the electronic and/or computer device 120 defines as zero the angular position $\theta_1$ of the feeler 110.

The actuation means then pivot the revolving plate 105. During this pivoting, the actuation means impose a constant radial force on the feeler 110 in the direction of the rotation axis A4, so that the support stem 111 of the feeler 110 remains in contact with the edge of the presentation lens 27.

During the rotation of the revolving plate 105, the electronic and/or computer device 120 read the planar coordinates $\rho_1, \theta_1$ of a plurality of points $P_1$ of the edge of the presentation lens 27 (for example 360 points angularly separated by 1 degree). These 360 felt points $P_1$ in this case also define a first longitudinal profile of the surround 21 of the half-rim spectacle frame.

Then, regardless of the circular or half-rim type of the selected spectacle frame, the planar $\rho_1, \theta_1$ or spatial $\rho_1, \theta_1, z_1$ coordinates of the 360 felt points $P_1$ are then transmitted by the electronic and/or computer device 120 to the computer unit 150 of the client terminal.

Obviously, as a variant, the coordinates of the longitudinal profile of the surround could be acquired by other means, for example by reading from a database register. Such a register would, for this purpose, comprise a plurality of records that would each be associated with a spectacle frame style and that would each contain the coordinates of a plurality of points characterizing the shapes of the surrounds of this spectacle frame style.

The coordinates of the longitudinal profile of the surround could also be acquired optically, using a laser appliance or an image capturing and processing appliance arranged to determine, from a snap shot of the selected spectacle frame, the coordinates of a plurality of points of each its surrounds.

Here, at the end of this second operation, the computer unit 150 of the client terminal transmits all the acquired data to the computer unit 250 of the manufacturer terminal. These data comprise in particular the prescriptions of the wearer and the coordinates of the 360 felt points $P_1$.

These data are then used to grind the two ophthalmic lenses of the wearer and to machine their optical faces to the desired shape, according to methods that are not the subject of the present invention.

They are then used to trim the duly obtained ophthalmic lenses, in order to bring their contours to the desired shape, as will be detailed later in this explanation.

Third Operation

The third operation consists in characterizing the shape of each surround 11, 21 in order to calculate a trimming parameter that can be used to generate the trimming setpoint for each ophthalmic lens 30.

This characterization method is implemented on the basis of just the planar coordinates $\rho_1, \theta_1$ of the felt points $P_1$ on the rim 11 of the spectacle frame 10 or on the presentation lens 27.

In this method, a projected profile 40 (FIG. 5) is then considered. This projected profile 40 is derived from the planar projection of the longitudinal profile of the surround 11, 21 in the plane $(X_1; Y_1)$. This projected profile 40 is therefore defined by the planar coordinates $\rho_1, \theta_1$.

The characterization method comprises, overall, three successive steps consisting in:

i) constructing at least two predetermined geometrical figures 41, 42, 43 around the projected profile 40, ii) calculating the differences between the projected profile 40 and each of the constructed geometrical figures 41, 42, 43, iii) from the target geometrical figures, each of which has an associated trimming parameter, selecting the target geometrical figure that is closest to the projected profile 40 according to the calculated differences.

In the step i), the computer unit 250 constructs three predetermined geometrical figures around the projected profile 40, namely a rectangle 41, an ellipse 42 and a rectangle with rounded corners 43.

The rectangle 41 is thus defined as the rectangle circumscribed on the projected profile 40, two sides of which are parallel to the horizontal axis $X_1$.

In Cartesian coordinates, the corners of this rectangle 41 then have the following coordinates: $(x_{1min}, y_{1min})$; $(x_{1min}, y_{1max})$; $(x_{1max}, y_{1max})$; $(x_{1max}, y_{1min})$. It has a horizontal length A and a vertical height B.

The ellipse 42 is in this case defined as the ellipse inscribed in the rectangle 41. Its two half-lengths are then equal to A/2 and B/2.

The rectangle with rounded corners 43 is also defined as the rectangle circumscribed on the projected profile 40, two sides of which are parallel to the horizontal axis $X_1$. The rounding of its corners has a radius of curvature $R_{43}$ which is either predetermined, for example equal to 5 mm, or determined according to the dimensions of the projected profile 40. In this case, the radius $R_{43}$ is defined according to the following function:

$$R_{43} = \min(A/5, B/5).$$

Once these three geometrical figures 41, 42, 43 have been characterized, the computer unit 250 determines in polar coordinates:

the function representative of the projected profile 40, denoted $\rho_{40}(t)$, the function representative of the rectangle 41, denoted $\rho_{41}(t)$, the function representative of the ellipse 42, denoted $\rho_{42}(t)$, and the function representative of the rectangle with rounded corners 43, denoted $\rho_{43}(t)$.

As a variant, it would be possible to choose to construct, around the projected profile 40, other geometrical figures, such as, for example, a rhombus, a pentagon, etc. The chosen geometrical figures could, moreover, be adjusted differently relative to the projected profile. They could, for example, be inscribed inside the projected profile. They could also be dimensioned so that the surface area delimited between each of them and the projected profile is minimal.

In step ii), the calculation of the differences between the projected profile 40 and each of the geometrical figures 41, 42, 43 in this case performed by approximating the area of the surface delimited between the projected profile 40 and each of the geometrical figures 41, 42, 43.

To this end, the computer unit 250 calculates the descriptors $FD_{n40}$ of the fourier series associated with the projected profile 40 according to the following formula:

$$FD_{n40} = \frac{u_n}{u_0}$$

with, for n ranging from 0 to N−1

$$u_n = \frac{1}{N} \cdot \sum_{i=0}^{N-1} \rho_{40}(t) \cdot e^{-i \cdot 2\pi \cdot n \cdot t}.$$

It also calculates, according to mathematically identical formulae, the descriptors $FD_{n41}$, $FD_{n42}$, $FD_{n43}$ of the fourier series associated with the rectangle 41, the ellipse 42 and the rectangle with rounded corners 43.

These fourier descriptors can thus be used to calculate a distance $d_{41}$ characteristic of the surface area delimited between the projected profile 40 and the rectangle 41, according to the formula:

$$d_{41} = \sqrt{\sum_{n=0}^{N-1} |FD_{n41} - FD_{n40}|}$$

They can also be used to calculate a distance $d_{42}$ characteristic of the surface area delimited between the projected profile 40 and the ellipse 42, according to the formula:

$$d_{42} = \sqrt{\sum_{n=0}^{N-1} |FD_{n42} - FD_{n40}|}$$

They can also be used to calculate the distance $d_{43}$ characteristic of the surface area delimited between the projected profile 40 and the rectangle 43, according to the formula:

$$d_{43} = \sqrt{\sum_{n=0}^{N-1} |FD_{n43} - FD_{n40}|}$$

These distances $d_{41}$, $d_{42}$, $d_{43}$ could also be approximated by other means, for example by determining the mean distance or the standard deviation separating the 360 points of the projected profile 40 from the 360 corresponding points of the geometrical figures 41, 42, 43 concerned.

In step iii), these three distances $d_{41}$, $d_{42}$, $d_{43}$ are used to determine the target geometrical figure closest to the projected profile 40.

The list of target geometrical figures from which the target geometrical figure closest to the projected profile 40 is selected is in this case greater than the initial list of geometrical figures constructed around the projected profile 40. This list thus comprises (in addition to a rectangle, an ellipse and a rectangle with rounded corners) a square, a square with rounded corners, a rim and an elliptical rectangle.

To select, from these target geometrical figures, the one that is closest to the projected profile 40, the computer unit calculates the ratios of the distances $d_{41}$, $d_{42}$, $d_{43}$ calculated in the preceding step, according to the formulae:

$$c_1 = \frac{d_{42}}{d_{41}}$$

$$c_2 = \frac{d_{42}}{d_{43}}$$

It also calculates the ratio of the length A to the height B of the rectangle 41, according to the formula:

$$c_3 = \frac{A}{B}$$

It then determines, from a table with three entries $c_1$, $c_2$, $c_3$ the target geometrical figure closest to the projected profile 40.

More particularly in this case, the computer unit 250 characterizes the projected profile 40 by a square if:
$c_1 > 1.05$,
$c_2 > 1.05$, and
$1.3 > c_3 > 0.7$.

Figure 6A:
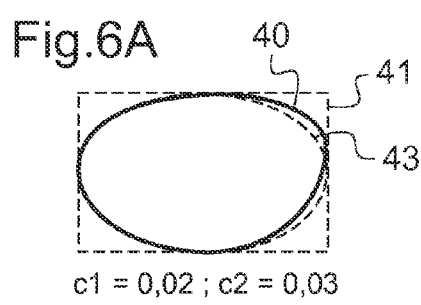
Figure 6B:
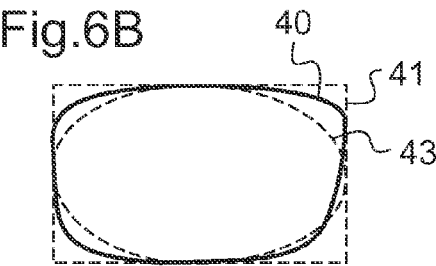

The computer unit 250 characterizes the projected profile 40 by a rectangle (FIG. 6E) if:
$c_1 > 1.05$,
$c_2 > 1.05$, and
$c_3 < 0.7$ or $c_3 > 1.3$.

The computer unit 250 characterizes the projected profile 40 by a square with rounded corners if:
$0.5 < c_1 < 1.05$,
$c_2 > 1.05$, and
$1.3 > c_3 > 0.7$.

The computer unit 250 characterizes the projected profile 40 by a rectangle with rounded corners (FIG. 6B) if:
$0.5 < c_1 < 1.05$,
$c_2 > 1.05$, and
$c_3 < 0.7$ or $c_3 > 1.3$.

The computer unit 250 characterizes the projected profile 40 by a rim (FIG. 6D) if:
$c_1 < 0.5$,
$c_2 < 0.5$, and
$1.3 > c_3 > 0.7$.

The computer unit 250 characterizes the projected profile 40 by an ellipse (FIG. 6A) if:
$c_1 < 0.5$,
$c_2 < 0.5$, and
$c_3 < 0.7$ or $c_3 > 1.3$.

Figure 6C:
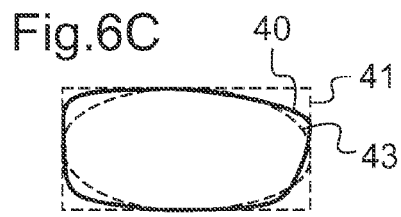
Figure 6D:
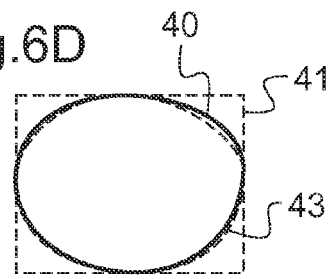
Figure 6E:
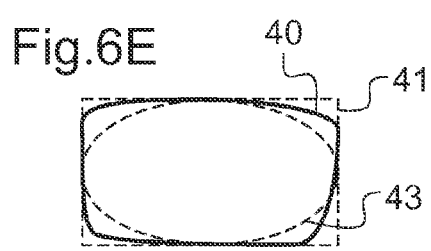

Otherwise, the computer unit 250 characterizes the projected profile 40 by an elliptical rectangle (FIG. 6C).

At this stage, provision can be made for the computer unit to record the target geometrical figure associated with the selected spectacle frame in an ad hoc database register. Thus, thereafter, when another wearer selects a spectacle frame of the same style, the computer unit can directly search in this database register for the target geometrical figure associated with this spectacle frame.

The selected target geometrical figure then forms, as will be described in more detail later in this explanation, a trimming parameter that can be used to generate the trimming setpoint for the ophthalmic lens 30.

Fourth Operation

The fourth operation consists in a calculation of the perimeter length $l_1$ of the surround 11, 21 of the selected spectacle frame 10, 20.

To generate the trimming setpoint, the computer unit 250 must in fact determine this other trimming parameter, so that the ophthalmic lens 30, once trimmed, can present a contour with a perimeter length equal to the perimeter length of the surround 11, 21.

The calculation of the perimeter length $l_1$ of the surround 11, 21 differs depending on whether the selected spectacle frame 10, 20 is circular or half-rim.

In the case where the spectacle frame 10 is circular, the calculation is performed on the basis of the spatial coordinates $x_{1,i}, y_{1,i}, z_{1,i}$ of the 360 felt points $P_{1,i}$, according to the following formula:

$$l_1 = \sum_{i=0}^{359} \sqrt{(x_{1,i+1} - x_{1,i})^2 + (y_{1,i+1} - y_{1,i})^2 + (z_{1,i+1} - z_{1,i})^2}$$

In the case where the spectacle frame 20 is half-rim, only the planar coordinates $x_1, y_1$ of 360 felt point $P_1$ are known, which does not make it possible to calculate the perimeter length $l_1$ of the surround 21.

Since the longitudinal profile has been acquired in two dimensions in the plane $(X_1; Y_1)$, the issue then, as shown more particularly in FIG. 7, is to distort this acquired longitudinal profile 50 so as to confer upon it a curvature (on the axis $Z_1$) which corresponds to the curvature of the surround 21.

For this, the computer unit determines the spatial coordinates $x_2, y_2, z_2$ of 360 points $P_2$ of a curved profile 51, derived from the projection of the 360 points $P_1$ on a predetermined reference surface.

This predetermined reference surface is in this case representative of the shape of the front face of the presentation lens 27. It is in this case spherical. Its radius of curvature $Rc_1$ is equal to a mean radius of curvature, calculated from the radii of curvature of a representative variety of presentation lenses (the radii of curvature of the presentation lenses are in effect generally identical or similar).

The projection is in this case an orthogonal projection on the normal axis $Z_1$. Consequently, the planar coordinates $x_2, y_2$ of the 360 projected points $P_2$ of the curved profile 51 are equal to the planar coordinates $x_1, y_1$ of the 360 points of the acquired longitudinal profile 50.

Expressed differently, the projection of the acquired longitudinal profile 50 consists, for the computer unit 250, in a simple calculation of the altitudes $z_2$ of the points $P_2$ of the curved profile 51 according to the radius of curvature $Rc_1$ and the planar coordinates $x_1, y_1$ of the points $P_1$, according to the following formula:

$$z_2 = Rc_1 - \sqrt{Rc_1^2 - \rho_1^2}, \text{with } \rho_1 = (x_1^2 + y_1^2)^{1/2}$$

The spatial coordinates $x_2, y_2, z_2$ of the points $P_2$ of the curved profile 51 are known, so the computer unit 250 then calculates the perimeter length $l_2$ of the curved profile 51, according to the following formula:

$$l_2 = \sum_{i=0}^{359} \sqrt{(x_{2,i+1} - x_{2,i})^2 + (y_{2,i+1} - y_{2,i})^2 + (z_{2,i+1} - z_{2,i})^2}$$

This perimeter length $l_2$ of the curved profile 51 is considered to be equal to the perimeter length $l_1$ of the surround 21.

Fifth Operation

The fifth operation consists in centering, orienting and projecting the longitudinal profile of the surround 11, 21 on the ophthalmic lens 30 so that, once assembled with the spectacle frame, the lens trimmed according to this projected longitudinal profile is appropriately centered facing the pupil of the corresponding eye of the wearer.

In the centering step, as shown by FIG. 8, the aim is to make the mounted coordinate system of the spectacle frame 10, 20 coincide with the optical coordinate system of the ophthalmic lens 30.

This coincidence setting operation is performed by aligning the horizontal axes $X_1, X_2$, the ordinate axes $Y_1, Y_2$, and the normal axes $Z_1, Z_2$ of the coordinates associated with these two frames of reference, then by centering the identified pupilary point (and therefore the longitudinal profile) in the coordinates $X_1, Y_1, Z_1$ of the frame on the centering point 34 identified in the coordinates $X_2, Y_2, Z_2$ of the lens.

In the orientation step, the aim is to orient the longitudinal profile of the surround 11, 21 around the centering point 34 according to an angle determined relative to the horizon lines 35 of the ophthalmic lens 30. This angle is determined by the optometrist, and is therefore included in the prescriptions of the wearer. It can be used to check that, once the lens is mounted in the surround, the distribution of its optical powers is appropriate to the corresponding eye of the wearer.

In the projection step, the aim is to rectify the longitudinal profile of the surround 11, 21, which does not have a curvature identical to that of the ophthalmic lens 30, in order to confer upon it such a curvature.

This step is more specifically performed by projecting the longitudinal profile of the surround 11, 21 onto the front face 31 of the ophthalmic lens 30, so as to be able to deduce the contour according to which the ophthalmic lens 30 must be trimmed.

Obviously, as a variant, this projection could be performed on another surface characteristic of the ophthalmic lens 30. It could, for example, be performed on the rear face 32 of the ophthalmic lens 30. It could also be performed on an intermediate surface having a curvature identical to that of one of the front 31 and rear 32 faces of the ophthalmic lens, that is to say on a surface that is situated between the front 31 and rear 32 faces of the ophthalmic lens 30 and which is parallel to the surface of one of these front 31 and rear 32 faces.

Here, as shown by FIG. 9, the projection is an orthogonal projection on the normal axis $Z_2$. Consequently, the planar coordinates $x_3, y_3$ of the 360 points $P_3$ of the projected longitudinal profile 52 (the "second longitudinal profile") are equal to the planar coordinates $x_1, y_1$ of the 360 points of the acquired longitudinal profile 50.

Expressed differently, the projection of the acquired longitudinal profile 50 consists, for the computer unit 250, in a simple calculation of the altitudes $z_3$ of the points $P_3$ of the projected longitudinal profile 52.

The front face of the ophthalmic lens 30 is in this case spherical and has a known radius of curvature $Rc_3$, so the calculation of the altitudes $z_3$ of the points $P_3$ of the projected longitudinal profile 52 is carried out according to the following formula:

$$z_3 = \sqrt{Rc_3^2 - \rho_1^2} - Rc_3, \text{with } \rho_1 = (x_1^2 + y_1^2)^{1/2}$$

Sixth Operation

Since the spatial coordinates $x_3, y_3, z_3$ of the points $P_3$ of the projected longitudinal profile 52 are known, the computer unit 250 corrects during the sixth operation the shape of the projected longitudinal profile 52, so that the corrected longitudinal profile 53 has a perimeter length $l_4$ equal to the perimeter length $l_1$ of the acquired longitudinal profile 50.

This correction is carried out in two steps, in this case successive, consisting in:

i) stretching, according to a given mathematical function f, the projected longitudinal profile 52 along the ordinate axis $Y_2$ (FIG. 10), then in ii) compressing the stretched longitudinal profile 52' along the horizontal axis $X_2$ until the perimeter lengths $l_1$, $l_4$ of the corrected longitudinal profile 53 and of the acquired longitudinal profile 50 are equal.

In the step i), the stretching of the projected longitudinal profile 52 along the ordinate axis $Y_2$ is used to check that the edge of the ophthalmic lens 30 mounted in its surround 11, 21 bears correctly on the bottom and top portions of the surround 11, 21.

The mathematical function f for stretching this projected longitudinal profile 52 is independent of the differences between the perimeter lengths of the various longitudinal profiles.

This mathematical function f is a vector fine mapping about the horizontal axis $X_2$ (also known by the term "expansion") applied to the planar coordinates $x_3$, $y_3$ of the points $P_3$ of the projected longitudinal profile 52. This vector fine mapping has a ratio k, called stretching coefficient.

Figure 10:
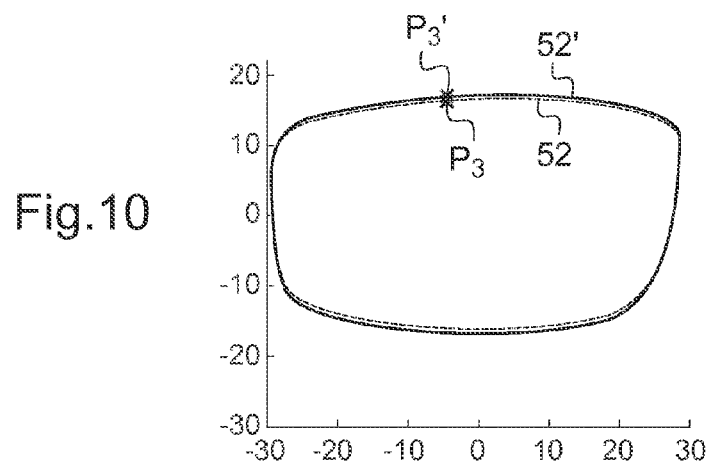
FIGS. 10 and 11 are views in the plane of FIG. 5, illustrating two steps for distorting the projected longitudinal profile of FIG. 9.
Figure 11:
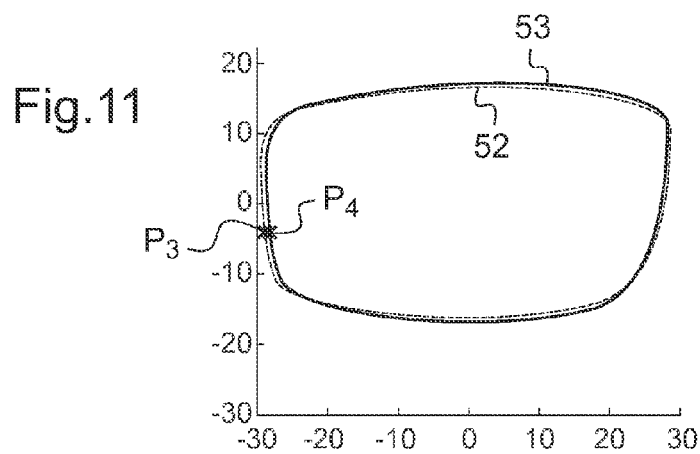

This function can thus be expressed in the form:

$$f(y_3)=y_3'=k \cdot y_3, \text{with } k \text{ preferably between 1 and 1.05}$$
(see FIG. 10).

This stretching coefficient k can be determined in various ways.

In a first embodiment, provision can be made for the stretching coefficient k to be constant for all points $P_3$ processed, but for it to be determined according to at least the target geometrical figure selected during the third operation.

As an example, provision can be made:
- to assign the value 1 to the stretching coefficient k if the selected target geometrical figure is a square, a square with rounded corners, a rim or an ellipse,
- to assign the value 1.01 to the stretching coefficient k if the selected target geometrical figure is a rectangle,
- to assign the value 1.02 to the stretching coefficient k if the selected target geometrical figure is rectangle with rounded corners,
- to assign the value 1.03 to the stretching coefficient k is the selected target geometrical figure is an elliptical rectangle.

It is also possible to optionally provide for this stretching coefficient k to be incremented or decremented by more or less 0.005, depending on whether the width of the rectified longitudinal profile 52 (on the horizontal axis $X_2$) is great or not.

It would also be possible to provide for this stretching coefficient k to be modified according to other parameters, such as the curve of the surround 11, 21, the curve of the ophthalmic lens 30 and the material of the selected spectacle frame 10, 20.

It would thus be possible to provide for the rectified longitudinal profile to be stretched more if the curve of the ophthalmic lens 30 is greater than that of the surround 11, 21 or if the spectacle frame is made of an elastically deformable material.

In a second preferred embodiment, it is possible to provide for the stretching coefficient k to be a variable that is expressed in the form of a function $j(x_3)$, and that therefore depends on the abscissa $x_3$ of the point $P_3$ concerned.

The stretching coefficient k is then determined in order to continually vary according to what is called a half-rim distribution, in order to be equal to 1 at the points $P_3$ of the projected longitudinal profile 52, the abscissae $x_{3max}$, $x_{3min}$ of which are maximum and minimum, and to be equal to a maximum threshold Smax greater than 1 at the points $P_3$ whose abscissae $x_3$ are equal to the mean of the minimum and maximum abscissae.

The stretching coefficient k will possibly, for example, be expressed in the following form:

$$k = j(x_3) = 1 + 4 \cdot Smax \cdot \frac{(x_3 - x_{3min}) \cdot (x_{3max} - x_3)}{(x_{3max} - x_{3min})^2}$$

This maximum threshold Smax is then determined according to at least the target geometrical figure selected during the third operation.

Whatever the case, at the end of this step i), the computer unit 250 obtains the spatial coordinates $x_3$, $y_3'$, $z_3$ of the points $P_3'$ of the stretched longitudinal profile 52'.

Step ii) modified the abscissae $x_3$ of these points $P_3'$ so as to obtain a corrected longitudinal profile 53 of perimeter length $l_4$ equal to the perimeter length $l_1$ of the acquired longitudinal profile 50.

During this step, the abscissae $x_3$ of the points $P_3'$ are modified by iteration according to the following formula:

$$x_{3,j+1} = x_{3,j} \cdot \left(1 + \frac{l_1 - l_{3,j}}{l_1}\right),$$

with $l_{3,j}$ being the perimeter length of longitudinal profile characterized by the coordinate points $x_{3,j}$, $y_3'$, $z_3$.

When this perimeter length $l_{3,j}$ becomes equal, to within 0.1%, to the perimeter length $l_1$ of the acquired longitudinal profile 50, the computer unit stops this iteration and stores the spatial coordinates $x_4$, $y_4$, $z_4$ of the points $P_4$ of the corrected longitudinal profile 53.

Seventh Operation

The seventh operation consists in determining a preform and finishing setpoint for the trimming of the ophthalmic lens 30, so as to trim it according to this corrected longitudinal profile 53.

This seventh operation varies according to the architecture of the trimming device used. It will not therefore be explained here in detail.

It also consists in determining a superfinishing setpoint for the trimming of the ophthalmic lens. This superfinishing setpoint can advantageously be generated so as to polish the lens according to a process dependent on the target geometrical figure selected during the third operation.

More particularly, provision can be made for the ophthalmic lens to be polished more intensely, that is to say over a longer period and/or with increased polishing force, if the selected target geometrical figure showed probable difficulties in mounting the ophthalmic lens 30 in its surround 11, 21.

Thus, it is possible to provide for the ophthalmic lens 30 to be polished for a normal duration if the selected target figure is a rim, an ellipse or an elliptical rectangle. It is possible on the other hand to provide for it to be polished for a longer duration if the selected target figure is a square, a square with rounded corners, a rectangle or a rectangle with rounded corners.

Prior to the sixth operation, it is possible, moreover, to provide for the mathematical stretching function f of the projected longitudinal profile 52 to be generated according to dispersion errors naturally generated by the ophthalmic lens trimming device.

These dispersion errors are, of course, linked to the architecture of the trimming device. However, they exhibit effects that are more or less sensitive upon the trimming of the lenses, depending on whether the lens is trimmed according to a more rectangular or more elliptical shape.

Thus, the ophthalmic lenses trimmed according to an overall rectangular longitudinal profile are more sensitive to the dispersion errors than the ophthalmic lenses trimmed according to an overall elliptical longitudinal profile.

To take account of this phenomenon, various mathematical functions f are generated, each associated with a target geometrical figure. For this, a database register is used, each record of which is associated with a target geometrical figure and stores a mean dispersion parameter.

For this, measurement operations are conducted on a variety of ophthalmic lenses trimmed according to longitudinal profiles of different shapes. The shape of each measured longitudinal profile is then compared to the trimming setpoint for the lens concerned, which makes it possible to calculate, for each measured ophthalmic lens, a difference called dispersion parameter.

Then, the mean dispersion parameter associated with the selected target geometrical figure is read from the database register and said parameter is modified according to the new calculated dispersion parameter, so as to refine the value of the mean dispersion parameter.

A mean dispersion parameter is thus obtained for each type of target geometrical figure. This parameter thus makes it possible to provide for the effect that each type of target geometrical figure has on the dispersion errors.

Thus, when calculating a new trimming setpoint for another ophthalmic lens, the mathematical stretching function f for the projected longitudinal profile 52 will possibly be determined by reading from the register the value of the mean dispersion parameter associated with the selected target geometrical figure.

Generally, beyond a certain number of measured lenses, the mean dispersion parameter will vary little since the dispersion errors will remain generally restricted to an identified range of values.

For a conventional machining device, the dispersion parameter will then generally be:
  reduced if the selected target geometrical figure is a square, a square with rounded corners, a rim or an ellipse,
  intermediate if the selected target geometrical figure is a rectangle or a rectangle with rounded corners,
  maximum if the selected target geometrical figure is an elliptical rectangle.

Consequently, the mathematical function f will possibly, for example, have a stretching coefficient k (or a maximum threshold Smax) substantially equal to:
  1 if the selected target geometrical figure is a square, a square with rounded corners, a rim or an ellipse,
  1.015 if the selected target geometrical figure is a rectangle or a rectangle with rounded corners,
  1.03 if the selected target geometrical figure is an elliptical rectangle.

The present invention is in no way limited to the embodiments described and represented.

In particular, the third, fourth and sixth operations will possibly be performed, not by the computer unit 250 of the manufacturer terminal, but by any other computer unit programmed for this purpose, for example by the computer unit of the client terminal.

The invention claimed is:

1. A method for generating a trimming setpoint for trimming an ophthalmic lens (30) in order to mount the ophthalmic lens in a surround (11, 21) of a spectacle frame (10, 20), the method to be implemented by an electronic or computer device and comprising the steps of:
   a) acquiring a shape of a first longitudinal profile (50) of said surround;
   b) constructing, on a two-dimensional projection (40) of said first longitudinal profile (50), at least two predetermined geometrical figures (41-43), by adjusting dimensions of said predetermined geometrical figures to dimensions of said two-dimensional projection (40);
   c) calculating differences ($d_{41}$-$d_{43}$) between the two-dimensional projection (40) of said first longitudinal profile (50) and each of said predetermined geometrical figures (41-43);
   d) among target geometrical figures associated to trimming parameters, selecting a target geometrical figure that is closest to the first longitudinal profile (50) according to said differences ($d_{41}$-$d_{43}$); and
   e) calculating said trimming setpoint according to the shape of the first longitudinal profile (50) and a trimming parameter associated with the selected target geometrical figure.

2. The method as claimed in claim 1, wherein, in the step e):
   a spatial shape of a second longitudinal profile (52), obtained from the projection of said first longitudinal profile (51) onto a characteristic surface of said ophthalmic lens (30), is determined,
   the second longitudinal profile (52) is distorted in two different directions, with distortion coefficients (k) applied to each direction, at least one of which is a function of the trimming parameter associated with the selected target geometrical figure, so as to equalize a perimeter length ($I_3$) of said second longitudinal profile (52) and a perimeter length ($I_1$) of said first longitudinal profile (50), and
   a trimming preform setpoint for the ophthalmic lens (30) is deduced from the distorted second longitudinal profile.

3. The method as claimed in claim 2, wherein said characteristic surface a front (31) or a rear (32) face of the ophthalmic lens (30).

4. The method as claimed in claim 2, wherein said characteristic surface is a surface situated between front (31) and rear (32) faces of the ophthalmic lens (30) and parallel to one of said front (31) and rear (32) faces.

5. The method as claimed in claim 1, wherein, in the step e), a superfinishing setpoint for trimming the ophthalmic lens (30) is determined according to the trimming parameter associated with the selected target geometric figure.

6. The method as claimed in claim 1, wherein, in the step b), at least three predetermined geometrical figures (41-43) are constructed.

7. The method as claimed in claim 1, wherein, in the step b), said predetermined geometrical figures comprise one of an ellipse (42), or a rectangle (41), or a rectangle with rounded corners (43).

8. The method as claimed in claim 1, wherein, in the step d), said target geometrical figures comprise at least said predetermined geometrical figures (41-43).

9. The method as claimed in claim 1, wherein, in the step b), the dimensions of said predetermined geometrical figures (41-43) are adjusted so that at least one of said geometrical figures (41) is circumscribed or inscribed on the two-dimensional projection (40) of the first longitudinal profile (50).

10. The method as claimed in claim 1, wherein, in the step b), the dimensions of said predetermined geometrical figures (41-43) are adjusted to minimize the difference ($d_{41}$) between the two-dimensional projection (40) of the first longitudinal profile (50) and at least one of said geometrical figures (41).

11. The method as claimed in claim 1, wherein, in the step c), said differences ($d_{41}$-$d_{43}$) are calculated by determining an area of the surface delimited between the two-dimensional projection (40) of the first longitudinal profile (50) and each of said geometrical figures (41-43).

12. The method as claimed in claim 11, wherein the determination of the difference ($d_{41}$-$d_{43}$) between the two-dimensional projection (40) of the first longitudinal profile (50) and each geometrical figures (41-43) comprises:
    calculating, in polar coordinates, representative functions ($\rho_{40}(t)$, $\rho_{41}(t)$, $\rho_{42}(t)$, $\rho_{43}(t)$) of said two-dimensional projection (40) and of each of the geometrical figures (41-43),
    calculating Fourier series associated with said representative functions,
    calculating descriptors ($FD_{n40}$, $FD_{n41}$, $FD_{n42}$, $FD_{n43}$) of said Fourier series,
    deducing said differences ($d_{41}$-$d_{43}$) from said descriptors ($FD_{n40}$, $FD_{n41}$, $FD_{n42}$, $FD_{n43}$).

13. The method as claimed in claim 1, wherein, in step d):
    at least one ratio ($c_1$, $c_2$) is calculated between said differences ($d_{41}$-$d_{43}$), and
    among predetermined intervals each associated with a target geometrical figure, an interval, within which each ratio ($c_1$, $c_2$) is located, is determined.

14. The method as claimed in claim 1, wherein, in step d), a ratio ($c_3$) of a length (A) to a width (B) of a rectangle (41) circumscribed on the first longitudinal profile (50) is calculated, and said target geometrical figure is selected, also according to said ratio ($c_3$).

15. The method as claimed in claim 1, wherein said surround comprises a rim (11) or an arch (21A) fitted with a thread (21B).

16. A method for configuring a device for preparing an ophthalmic lens (30) in order for the ophthalmic lens to be mounted in a surround (11, 21) of a spectacle frame (10, 20), comprising:
    generating a trimming setpoint for a first ophthalmic lens according to the method of claim 2;
    trimming said first ophthalmic lens according to the generated trimming setpoint;
    measuring, on the trimmed ophthalmic lens, a longitudinal profile running along an edge of the ophthalmic lens;
    calculating a difference between a form of the measured longitudinal profile and a form of the distorted second longitudinal profile;
    searching, in a database register, each record of which has an associated target geometrical figure and stores a mean difference, for the record that is associated with the target geometrical figure selected in step d); and
    reading the mean difference stored in said record and modifying said stored mean difference according to said calculated difference.

17. The method as claimed in claim 16, wherein, in order to generate the trimming setpoint for another ophthalmic lens, in step e), the database register is searched for the record that is associated with the target geometrical figure selected in step d), the mean difference stored in said record is read, and a distortion coefficient (k) of the second longitudinal profile (52) is calculated according to said read mean difference.

* * * * *